US008472444B2

(12) United States Patent
Dighe et al.

(10) Patent No.: US 8,472,444 B2
(45) Date of Patent: Jun. 25, 2013

(54) METHOD AND APPARATUS FOR HANDLING TRAFFIC IN A DATA COMMUNICATION NETWORK

(75) Inventors: Sahil P. Dighe, Salt Lake City, UT (US); Joseph F. Olakangil, Midvale, UT (US)

(73) Assignee: Alcatel Lucent, Paris (FR)

( * ) Notice: Subject to any disclaimer, the term of this patent is extended or adjusted under 35 U.S.C. 154(b) by 320 days.

(21) Appl. No.: 12/827,891

(22) Filed: Jun. 30, 2010

(65) Prior Publication Data

US 2012/0002543 A1 Jan. 5, 2012

(51) Int. Cl.
*H04L 12/28* (2006.01)

(52) U.S. Cl.
USPC .......................................... 370/392; 370/401

(58) Field of Classification Search
USPC ................ 370/230–234, 252–255, 389, 392, 370/400, 401
See application file for complete search history.

(56) References Cited

U.S. PATENT DOCUMENTS 6,208,616 B1 * 3/2001 Mahalingam et al. ........ 370/216
6,567,377 B1 * 5/2003 Vepa et al. .................... 370/230
6,718,393 B1 * 4/2004 Aditya ......................... 709/239
6,950,395 B1 * 9/2005 Bashandy et al. ......... 370/230.1
7,808,894 B2 * 10/2010 DeVal et al. ................. 370/229
2007/0002738 A1 * 1/2007 McGee ........................ 370/230
2008/0117909 A1 * 5/2008 Johnson ....................... 370/392
2010/0054126 A1 * 3/2010 Kwan et al. .................. 370/235

* cited by examiner

*Primary Examiner* — Hong Cho
(74) *Attorney, Agent, or Firm* — Stephen Wyse

(57) ABSTRACT

A method and apparatus for offloading data traffic routing from one NI (network interface) to another. The NI receives data traffic, and that portion of the data traffic that must be L3 routed is passed to the CPU of the NI though a token bucket meter or equivalent metering device that selectively designates a portion of the routing traffic to another NI for routing. The portion of the traffic designated corresponds to the capacity of the CPU and offloading a portion of the data traffic helps to reduce the number of packets that are discarded when a CPU is overloaded. The threshold for determining when and in what quantity the data traffic should be offloaded is either statically or dynamically set, and in the latter case may be updated automatically when traffic levels and, in some implementations, other considerations require.

20 Claims, 4 Drawing Sheets

METHOD AND APPARATUS FOR HANDLING TRAFFIC IN A DATA COMMUNICATION NETWORK

TECHNICAL FIELD

The present invention relates generally to the field of data communication networks, and, more particularly, to a method and apparatus for handling traffic in such a network by selectively offloading a portion of the routing traffic received at one NI (network interface) to another in a multi-NI routing platform whenever necessary or desirable, for example for load-distributing and for making the most efficient use of available network resources.

BACKGROUND

The following abbreviations are herewith defined, at least some of which are referred to within the following description of the state-of-the-art and the present invention.

CPU Central Processing Unit
IP Internet Protocol
L2 Layer 2 (data link layer of the OSI reference model)
L3 Layer 3 (network layer of the OSI reference model)
LAN Local Area Network
MAC Media Access Control
NI Network Interface
OSI Open Systems Interconnection
PC Personal Computer
TCAM Ternary Content Addressable Memory
TCP Transmission Control Protocol
VLAN Virtual LAN Computers may be connected to one another to form a computer network, for example a LAN (local area network) implemented by an enterprise of some kind. Computers connected together in this way may share data and computing resources and allow users to communicate and work with each other. The LAN or other network may be small, consisting of only a small number of computers and networking devices, or it may be very large, as in the case of a large company, university, or government agency. It may be isolated, that is, capable of communicating only within the network itself, but more typically present-day networks are also interconnected with other networks such as the Internet as well.

Data transmitted to and from the computers in a network is segmented at the transmitting device into discrete units such as packets or frames. Each unit of data traverses the network, or a number of networks, before reaching its intended destination. The receiving device can then reassemble the data into a suitable form for processing or storage. In most instances, the data units do not travel directly from the sending to the receiving devices, which are often not directly connected to one another, but are instead transmitted via a number of intermediate nodes such as bridges, switches, or routers.

To ensure the proper transmission of data units, standard protocols have been developed. For example, Ethernet is a layer 2 protocol used by many LANs. “Layer 2” is a reference to the data link layer of the OSI model. The OSI model is a hierarchical description of network functions that extends from the physical layer 1 to application layer 7. The MAC (media access control) layer is considered a part of layer 2. In MAC bridging, the MAC addresses that are assigned to each node are “learned” so that intermediate nodes come to associate one of their ports with one or more MAC addresses. When a frame of data is received it includes a destination MAC address and is forwarded, or “bridged”, on the appropriate port.

TCP/IP is a layer 3, or network layer protocol. A received data packet includes an IP (Internet protocol) address that is read by a device such as a router, which is in possession of information enabling the router to determine a path to the destination node and route the packet accordingly. Although layer 3 routing is somewhat more involved, and in some cases slower than layer 2 bridging, there are situations in which it is advantageous or necessary. Many modern network nodes perform both bridging and routing functions.

One such device is an NI (network interface—sometimes referred to as an NI card), which in many networks may be positioned, for example, to directly communicate with another network or with a user device such as a PC or laptop. The routing function of the NI maybe used, for example, to direct received packets to a specific subnetwork or VLAN (virtual LAN) within the network itself. Two or more NIs may be functionally tied together and, in some cases, housed in the same chassis, or housing. This implementation environment is sometimes referred to as a multi-NI platform (or multi-NI chassis, as applicable). As just one example, one NI may offload L3 routing traffic to another NI, for during the initialization and synchronization process as described in U.S. patent application Ser. No. 12/816,871, entitled Method and System for Handling Traffic in a Data Communication System, filed on 16 Jun. 2010, which is incorporated herein by reference.

In a multi-NI environment, ports on each NI often receive or transmit data traffic from and to certain other devices, to which they are connected by one or more physical link. Received data traffic is then forwarded toward its intended destination, in most cases by the NI at which it was received. At times, however, traffic may ingress at a particular NI at a rate higher than it can handle, or at least higher than it can handle with a particular quality of service level. When this occurs, a portion of the received traffic that would otherwise have been routed if the incoming traffic rate were not so great is simply dropped. While some network protocols may provide for the eventual retransmission of dropped packets, dropping them introduces both delay and the inefficient use of network resources. A manner of minimizing the number of dropped packets even at high traffic levels would therefore be of great advantage, especially if it could be accomplished without the need for user intervention. Of course, a faster CPU (central processing unit) could be installed in the NI, enabling more traffic to be routed. This solution, however, is not always possible or desirable. A great deal of expense may be incurred, for example, to install capacity that is in some cases infrequently needed. And of course a CPU operable at the desired speed may not be available at all or technically feasible.

Note that the description of related art in this disclosure is for the purpose of describing the operational environment of the present invention but is not an admission that any solution described is generally or specifically known to anyone other than the inventors.

Accordingly, there has been and still is a need to address the aforementioned shortcomings and other shortcomings associated with data traffic handling in certain situations, such as when the NI experiences traffic rates so high that all of the traffic cannot be satisfactorily handled. These needs and other needs are addressed by the present invention.

SUMMARY

The present invention is directed to a manner of handling data traffic in an NI (network interface) that is in communication with a data communication network. Advantageously, the present invention seeks to reduce the number of discarded packets by providing for the offloading of a portion of routing traffic received at a first NI to at least one other NI, for example a second NI in a multi-NI platform.

In one aspect, the present invention is a method of handling data traffic in an NI comprising a CPU and communicating with a data communication network, including the steps of receiving data traffic in the NI, determining that the quantity of received data packets to be routed by the CPU has exceeded a threshold value, and offloading a portion of the received data traffic if the threshold value has been exceeded. The offloaded data traffic may be forwarded to one or more other NIs, such as those that operate together in a multi-NI platform. The threshold value may be implemented using a meter, such as a token bucket meter, that designates data traffic exceeding the threshold flow rate for offloading. The threshold may be static and assigned by the network operator, or it may be dynamically adjustable. The threshold typically corresponds though is not necessarily equal to the routing capacity of the NI. In some embodiments, the threshold adjustments are based on the current CPU load and optionally the CPU load of other NIs in a multi-NI platform as well. The offloaded data traffic is preferably carried to the other NI or NIs over an inter-NI link.

In another aspect, the present invention is an NI for use in a data communications network, including a CPU for routing data traffic, a memory device for storing routing information, and a meter for designating routing traffic that exceeds a threshold amount for routing by at least a second NI. In a preferred embodiment, the meter is a token bucket meter and the memory device is a TCAM. A threshold adjustor for adjusting the threshold amount may also be present to periodically or continually adjust the threshold based on current conditions.

In yet another aspect, the present invention is a system for handling data traffic, including a first NI having a CPU for routing data traffic and a meter for designating traffic that exceeds a threshold amount be forwarded to another NI for routing, a second NI having a second CPU for routing data traffic, and an inter-NI link operable for data communication between the first NI and the second NI.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of handling data traffic in a NI (network interface). Specifically, the present invention includes a method and apparatus for offloading a portion of the L3 routing traffic received at an NI to at least one other NI. In a preferred embodiment, the offloading will be to another NI in a multi-NI platform, and the present invention will now be described in this environment. Other embodiments, however, are of course possible without departing from the spirit of the invention.

Figure 1:
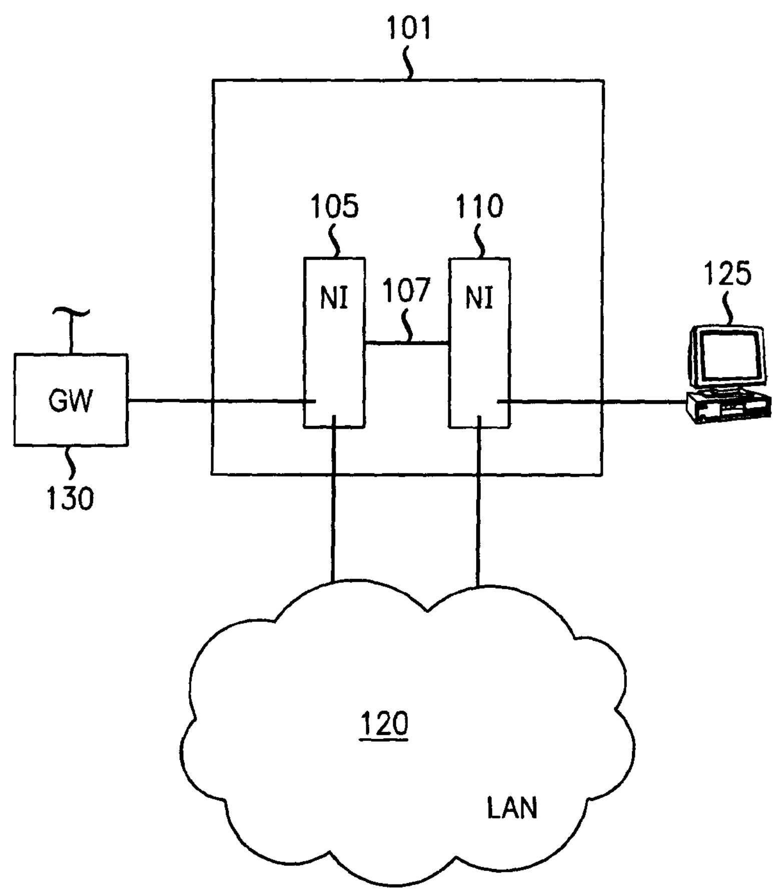
FIG. 1 is a schematic diagram illustrating selected components of a multi-NI chassis and associated components of a data communication network in which an embodiment of the present invention may be advantageously implemented.

FIG. 1 is a schematic diagram illustrating selected components of a multi-NI chassis 101 and associated components of a data communication network in which an embodiment of the present invention may be advantageously implemented. As might be expected, the multi-NI platform is used in environments where a single NI might be inadequate, or where the security of redundancy is desired. In this embodiment, NI 105 and NI 110 are shown housed together in a single chassis 101, although in other embodiments they might be physically separated, for example residing in different chassis. In other words, a multi-NI platform according to the present invention may be but is not necessarily implemented in a single-chassis configuration.

For purposes of illustration, NI 105 is shown connected to a gateway 130, which in turn communicates with another network (for example, the Internet; not shown). NI 110, on the other hand, is shown in communication with a single user device 125. In this embodiment, both NI 105 and NI 110 are also in direct communication with a LAN 120. LAN 120 may be expected to include a number of user devices and other components, although these are not separately shown. This configuration is of course exemplary rather than limiting.

In the embodiment of FIG. 1, NI 105 and NI 110 are directly connected to each other by an inter-NI link 107. Although NI 105 and N 110 may also be able to communicate with each other in some other fashion, for example, via LAN 120, the inter-NI link 107 provides a reliable and generally-speaking less congested communication link. It is noted, however, that there may be more than two NIs in a given chassis or other multi-NI platform, in which case the inter-NI link or links may serve more then two NIs. In some embodiments, however, a dedicated inter-NI link may be provided between two NIs even though other NIs are also present.

Returning to the embodiment of FIG. 1, in accordance with this embodiment of the present invention, either or both of the two NIs 105 or 110 may be configured to off-load their routing traffic to the other. For example, NI 105 may receive traffic from gateway 130 that needs to be routed, but instead of performing the routing function itself, NI 105 bridges this traffic to NI 110, which performs the routing function for the data traffic it receives from NI 105 as well as for routing traffic, if any, it receives from other sources. In other embodiments, NIs 105 and 110 may offload traffic to other NIs as well.

In accordance with the present invention, data traffic that needs to be routed but is in excess of the capacity of the CPU of one of the NIs may be offloaded to at least one other NI, in this embodiment to another NI in the multi-chassis platform. The desired result, of course, is fewer packets dropped to do NI CPU capacity issues, and a reduction in the need to purchase newer and faster equipment. The offloading process according to the present invention will now be described in greater detail.

Figure 2:
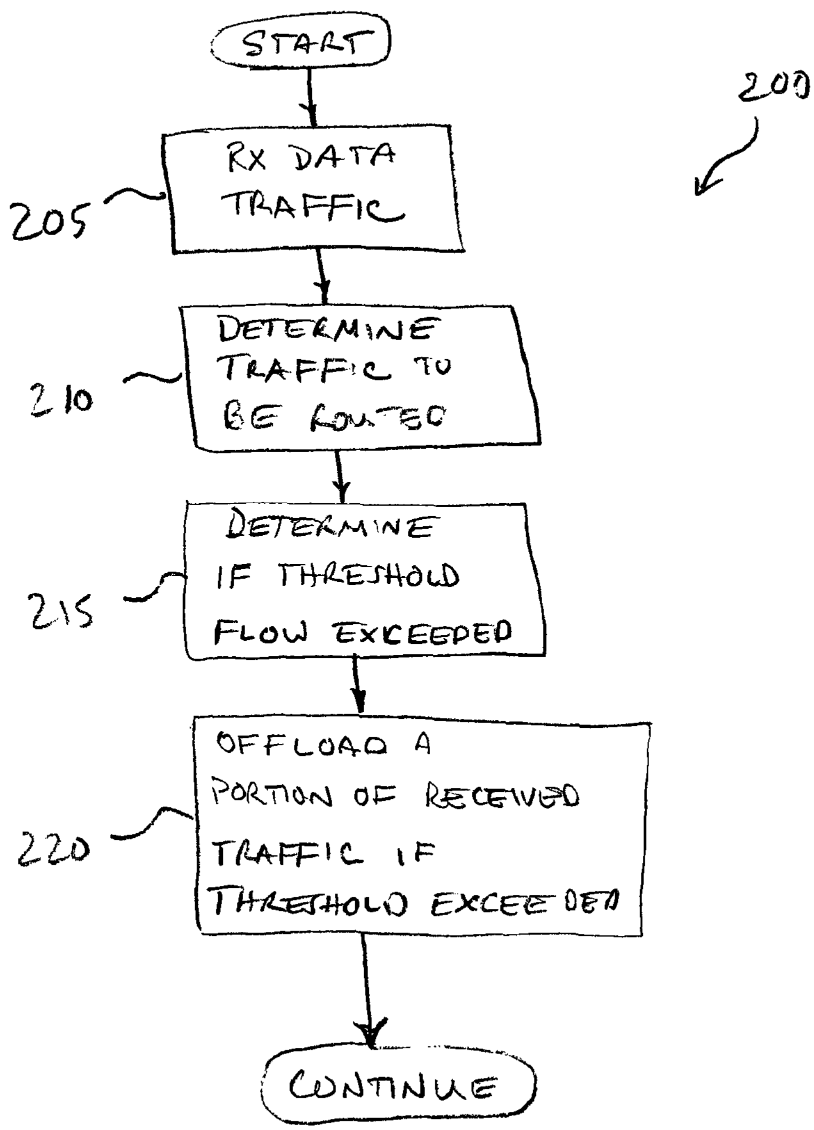
FIG. 2 is a flow diagram illustrating a method for handling data traffic in an NI according to an embodiment of the present invention.

FIG. 2 is a flow diagram illustrating a method 200 for handling data traffic in an NI environment according to an embodiment of the present invention. At START it is presumed that the components necessary to performing the method 200 are available and operational. The process then begins with receiving data traffic in the NI (step 205). This traffic, as mentioned above, may come from a variety of sources. In the embodiment of FIG. 1, for example, the data traffic may be received from individual users, from the LAN, or from another network via some type of gate way device. The data traffic may also come from another NI, for another NI in a multi-NI environment, although in reference to FIG. 2 this traffic will for simplicity not be discussed (but see the description of FIGS. 3 and 4 below).

Figure 4:
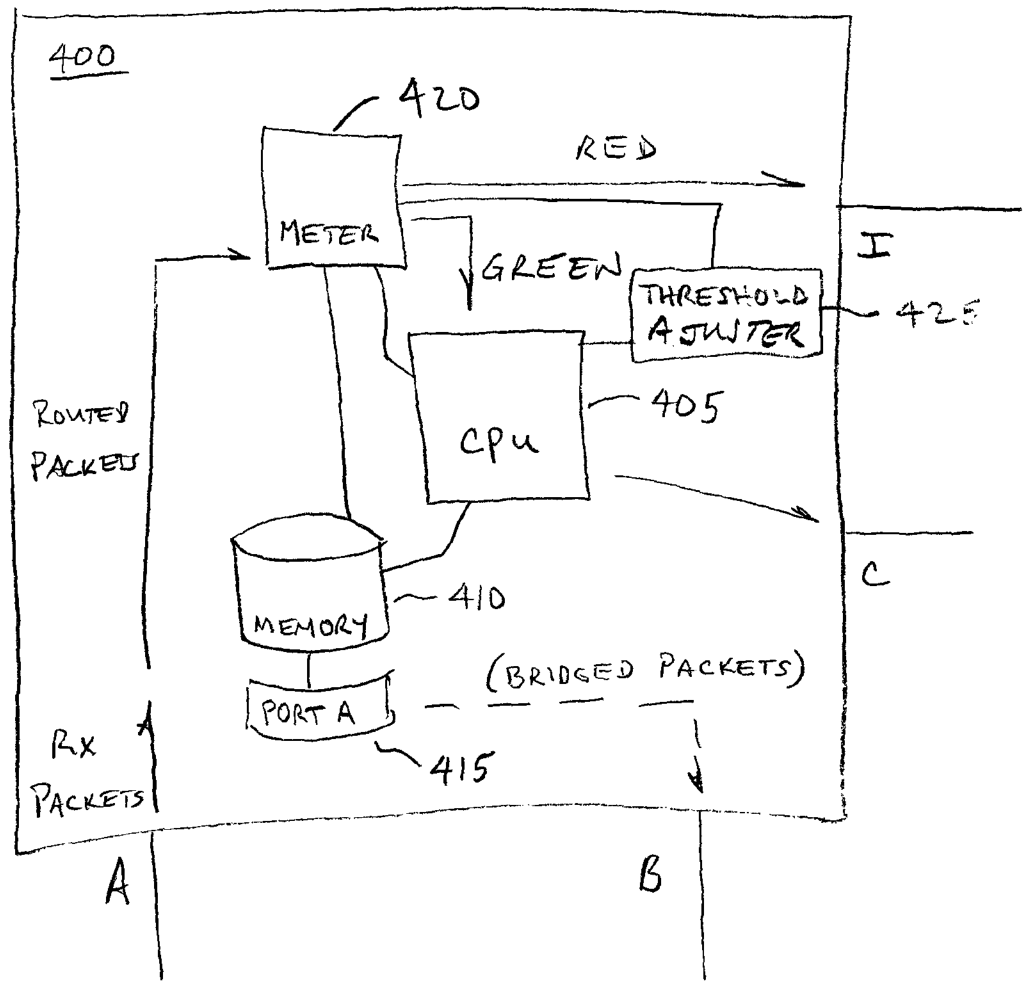
FIG. 4 is a simplified block diagram illustrating an NI configured according to an embodiment of the present invention.

In the embodiment of FIG. 2, when data traffic is received at step 205, the NI determines (step 210) whether all or some of the received traffic is to be routed by the CPU of the NI (see FIG. 4). Note that this determination may be active or passive, or a combination of both. That is, incoming packets may be examined to determine whether routing is required, or they may simply be routed if they are not, for example, bridged to another device by reference to learned MAC addresses or flooded if the relevant MAC address is not associated with a particular port for forwarding.

In this embodiment, the NI then determines (step 215) if the flow rate of data traffic sent to the CPU exceeds a threshold. In some cases, this threshold is predetermined and set, for example, by a network operator. In other cases the threshold may be dynamically updated. While the threshold is in most cases representative of the capacity of the CPU to route traffic, either generally or in light of extant circumstances, there is no requirement that the threshold be set at a maximum capacity level. In addition, while the threshold is normally associated with CPU routing capacity, if may instead or in addition be associated with another factor or factors as well.

Finally, in the embodiment of FIG. 2, the NI offloads (step 220) a portion of the received data traffic if the threshold has been exceeded. This portion may be the total of all routing traffic exceeding the threshold but it need not be. In some implementations, some of the traffic exceeding the threshold may be offloaded, while another portion is discarded. In other cases the NI need not limit the amount of offloaded traffic to that received routing traffic in excess of the threshold.

Note that the method 200 preferably continues as long as data traffic is being received. In this way at least a portion of the received data traffic that would otherwise have been discarded may be offloaded to another NI for routing instead. Another embodiment of this process will now be examined in more detail.

Figure 3:
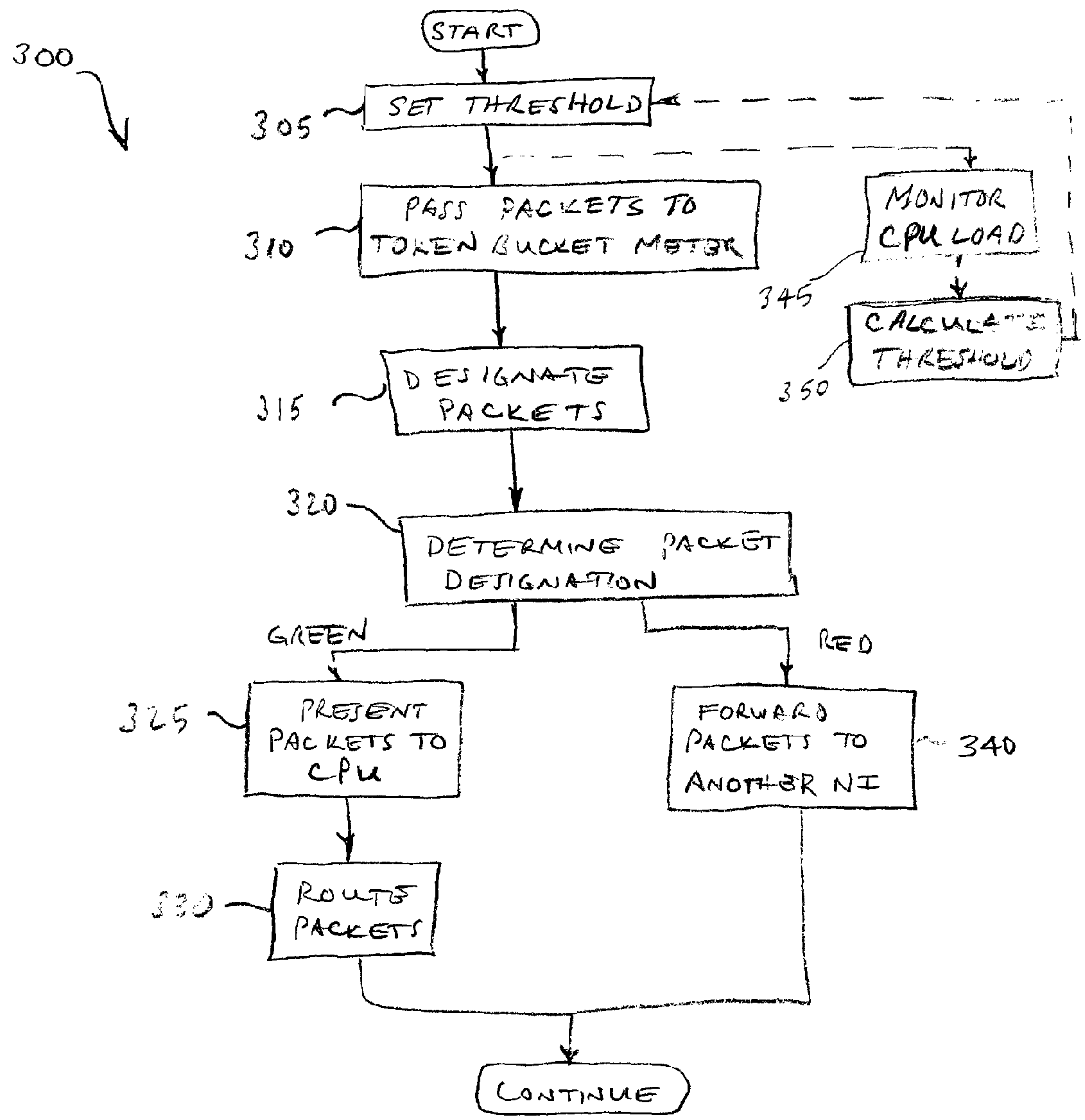
FIG. 3 a flow diagram illustrating a method for handling data traffic in an NI according to another embodiment of the present invention.

FIG. 3 a flow diagram illustrating a method 300 for handling data traffic in an NI according to another embodiment of the present invention. At START it is presumed that the components necessary for performing method 300 are available and operational. The process then begins with setting a threshold (step 305) for the packet flow that is to be handled by the CPU. As mentioned above, this threshold may be set manually by a network operator (a term here intended to cover anyone who might perform this task) or automatically by the system itself. The threshold is normally related to the capacity of the CPU to route packets and, in most implementations, represents the greatest rate at which packets will be presented to the CPU for routing. This may be the maximum capacity of the CPU, or a certain fraction thereof, and may be fixed or dynamically-adjusted. Once the threshold has been set at step 305, selective packet offloading based on this threshold may begin.

Here it is noted that setting the threshold does not, absent some special configuration, prevent the NI from receiving and routing packets normally. That is, received data packets that can be routed by the NI CPU are forwarded toward their destination and any packets beyond its capacity are simply discarded. In most implementations, the network operator may cease operation of the present invention (not shown) and return to this configuration. This may be done, just as one example, when one or more (other) NIs are scheduled to be removed from service.

In the embodiment of FIG. 3, the threshold is set at step 305 by configuring a token bucket meter to designate data packets as green or red depending on the flow rate of data packets to the CPU. The token bucket meter of this embodiment is an electronic apparatus into which electronic tokens are placed at a set rate—in this case the threshold rate. A token is removed for each received data packet that passes through the token bucket meter if there are in fact tokens available. In some implementations, packet size is also taken into consideration, and more tokens are removed for larger packets, less tokens for smaller.

In this embodiment, IP packets, that is, those that are to be routed according to a L3 protocol, when received at the NI are processed through the token bucket meter (step 310). The token bucket meter then places a designation (step 315) on each of the packets, in this embodiment green or red. Those packets passing the token bucket meter when it has tokens in it are designated green; those passing an empty token bucket meter are designated red.

Note that "red" and "green" are more or less arbitrary designations representative of some value that is inserted into each packet indicating its color. This may include altering only one of red or green packets and not the other. In some other embodiments, no alteration is made but the packets are in some way forwarded or designated for forwarding appropriately. The key of course is designating them in some way that permits discrimination.

In the embodiment of FIG. 3, a determination can then be made (step 320) as to whether each packet is green or red. Green packets are presented (step 325) to the CPU of the NI for routing. The CPU then makes a routing decision and the packets are placed on an appropriate port (step 330) for forwarding toward their intended destination. Red packets, on the other hand, are not presented to the CPU of the NI but instead placed on an appropriate port (step 340) for transmission to the CPU of another NI. In some embodiments (see, for example, FIG. 1), the other NI with be one that is located in the same platform or chassis as the offloading NI.

In other embodiments, there may be a plurality of other NIs (not shown) available. In that case, one of these may be exclusively assigned as the offloaded traffic recipient, in which case the second NI receiving the offloaded data traffic may itself offload this traffic to a third NI. Where this scenario is implemented, it may be useful to add an identifier to each packet indicating the first NI (to offload the packet); and if it eventually returns to the first NI it must be routed or discarded. In another alternate embodiment, the first NI selects the other NI or NIs to which offloaded traffic should be forwarded. A second (or third, et cetera) threshold may be implemented for this purpose so that only a maximum amount of data traffic is forwarded to a specific device. An additional token bucket meter or meters may be used if necessary.

In one implementation, successful results have been achieved using Broadcom® chipsets BCM56504 and BCM56620. In this case, the port used for offloading packets to the CPU of another NI may be the HiGig™ port.

In the embodiment of FIG. 3, once the determination is made at step 320 and the packets routed accordingly, the process continues as long as packets are received in the NI.

Optionally, the threshold may be dynamically adjustable. In such an embodiment, the load on the CPU may be monitored (step 345) and a new threshold calculated (step 350) based on current conditions. If a new threshold is calculated, the process may then return to step 305 and the newly-calculated threshold is set. This may be done continually or on a periodic basis, or it may be performed only upon receipt of a command from the network operator. In some implementations, it may be performed when an alarm of some kind is generated by the system. In other embodiments, the load on other CPUs may be monitored as well, for example increasing the threshold if other CPUs appear to be heavily loaded.

Here it is also noted that while some of the operations of method 300 are similar or analogous to those of method 200 described above in reference to FIG. 2, they are different embodiments of the present invention and operations of one are not necessarily present in the other by implication. Note also that the sequence of operations depicted in FIGS. 2 and 3 are exemplary; these operations may occur in any logically-consistent sequence in other embodiments. Finally, note that additional operations may be performed in either sequence, and in some cases operations may be subtracted, without departing from the spirit of the invention.

FIG. 4 is a simplified block diagram illustrating an NI 400 configured according to an embodiment of the present invention. In this embodiment, NI 400 includes a CPU 405 for, among other things, controlling other components of NI 400 and routing received packets toward their intended destination. Memory device 410 is used to store operating programs and data and is in communication with CPU 405. Port A memory device 415 is separately shown as a location in which routing tables and other information useful to processing received packets may be stored. Note, however, that port A memory device 415 need not be a physically separate component. In a preferred embodiment, the memory for NI 400, that is, either or both memory 410 and port A memory 415 are implemented in a TCAM.

In the embodiment of FIG. 4, NI 400 is shown as having four ports, referred to as A, B, C, and I. The number of ports is exemplary, and many devices will include more or, in some cases, fewer. A, B, and C are in this example ordinary data ports for connecting to other network components. Port I, in the on the other hand, is in this embodiment an inter-NI port, for communicating over a link directly to another NI in a multi-NI platform. In some instances, port I may be used to communicate with multiple other NIs. Although NI 400 may also communicate with other NIs via its ordinary data ports, it is generally more efficient and reliable to do so via port I and the inter-NI link.

In accordance with this embodiment of the present invention, arrows in FIG. 4 are used to illustrate potential data traffic paths through NI 400. These paths are exemplary and other paths may be taken as well. As illustrated in FIG. 4, data traffic is received at port A, and the information in port A memory device 415 is consulted to determine its path. Some of this data traffic is not routed traffic; a portion may be bridged on port B, for example, as illustrated by the broken line in FIG. 4. Traffic that the information in port memory device A indicates is to be routed is passed to the traffic meter 420, which in a preferred embodiment is a token bucket meter. Meter 420, in this embodiment, designates the packets to be routed as either red or green. Green packets are presented to the CPU for routing, in this case on port C (which again is simply an example for illustration). Packets designated red by the token bucket meter 420 are placed in the inter-NI link at port I, for routing by the CPU of another NI (not shown in FIG. 4).

Here it is noted that some of the packets received at an NI may in fact be those offloaded by another. These packets may be handled in the same manner as other arriving packets, that is, they are presented to the token bucket meter and designated either red or green. In other embodiments, the packets from another NI may be accorded a higher, or alternately a lower priority relative to those otherwise received in the second NI.

In this manner the present invention provides an apparatus, system and method for handling data traffic in an NI by enabling the efficient offloading of data traffic from one NI to another or to multiple others from which the data traffic can be routed. This is expected to be of particular advantage in a multi-NI platform environment and result in a more even routing traffic distribution with fewer discarded packets.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of handling data traffic in an NI (network interface) device comprising a CPU and communicating with a data communication network, the method comprising:

receiving data traffic in the NI;

determining whether the quantity of received data packets to be routed by the CPU has exceeded a threshold value;

offloading a portion of the received data traffic exceeding the threshold if the threshold value has been exceeded; and determining whether received data packets include a data packet indicator;

wherein the data packet indicator comprises a value indicating the device that provided the packet indicator, and further comprising discarding the packet if the packet indicator indicates that the value was provided by the NI.

2. The method according to claim 1, wherein the NI is operating in a multi-NI platform and the offloading comprises offloading data traffic to at least another NI in the multi-NI platform.

3. The method according to claim 2, wherein the offloaded data traffic is offloaded to a plurality of NIs.

4. The method according to claim 3, wherein each of the plurality of NIs is in the multi-NI platform.

5. The method according to claim 2, wherein the offloading comprises offloading data traffic over an inter-NI link.

6. The method according to claim 1, wherein the threshold value is a static predetermined flow rate.

7. The method according to claim 1, wherein the threshold value is dynamically adjustable.

8. The method according to claim 1, wherein the determining whether the quantity of received data packets to be routed by the CPU has exceeded a threshold value comprises metering the flow rate of the incoming data packets.

9. The method according to claim 8, wherein the metering is performed by a token bucket meter providing a packet indicator for received data traffic.

10. The method according to claim 9, wherein offloading a portion of the received data traffic comprises comparing the packet indicator with a value stored in a memory device.

11. The method according to claim 10, wherein the memory device is resident in the NI.

12. The method according to claim 11, wherein the memory device is a TCAM (ternary content addressable memory).

13. An NI for use in a data communications network, comprising:

a CPU for routing data traffic;

a memory device for storing routing information; and a meter for designating at least a portion of any routing traffic that exceeds a threshold amount for routing by at least a second NI; and a determiner for determining whether received data packets include a data packet indicator;

wherein the data packet indicator comprises a value indicating the device that provided the packet indicator, and further comprising discarding the packet if the packet indicator indicates that the value was provided by the NI.

14. The NI of claim 13, wherein the meter is a token bucket meter.

15. The NI of claim 13, further comprising a threshold adjustor for monitoring the CPU and adjusting the threshold amount.

16. A system for handling data traffic, comprising:

a first NI, comprising a CPU for routing data traffic, a meter for designating at least a portion of any traffic that exceeds a threshold amount be forwarded to another NI for routing and a determiner for determining whether received data packets include a data packet indicator, wherein the data packet indicator comprises a value indicating the device that provided the packet indicator, and further comprising discarding the packet if the packet indicator indicates that the value was provided by the NI;

a second NI comprising a second CPU for routing data traffic; and an inter-NI link operable for data communication between the first NI and the second NI.

17. The system of claim 16, wherein the first NI comprises a threshold adjustor for monitoring the CPU and adjusting the threshold amount.

18. The system of claim 17, wherein the threshold adjustor also monitors the second CPU.

19. The system of claim 16, further comprising a third NI, the third NI comprising a third CPU for routing data traffic, wherein the meter forwards traffic exceeding a second threshold amount to the third NI for routing.

20. The system of claim 16, wherein the first NI and the second NI form at least part of a multi-NI platform.

* * * * *